July 14, 1970 D. C. LUCENTI ETAL 3,520,215

TORQUING MACHINE

Filed April 10, 1968

INVENTORS

DOMINICK C. LUCENTI
CLAUDE W. HEARN

BY *William R. Wright*

AGENT

United States Patent Office 3,520,215
Patented July 14, 1970

3,520,215
TORQUING MACHINE
Dominick C. Lucenti, Fallsington, and Claude W. Hearn, Bristol, Pa., assignors to Thiokol Chemical Corporation, Bristol, Pa., a corporation of Delaware
Filed Apr. 10, 1968, Ser. No. 720,122
Int. Cl. B25b; B23q 5/00
U.S. Cl. 81—52.4
6 Claims

ABSTRACT OF THE DISCLOSURE

A machine for tightening a threaded member with respect to a mated part wherein a weight is lifted by a pull exerted by a torque arm. This machine makes it possible to obtain accurate and predictably reproducible results on a mass production basis in a semi-automatic manner.

---

The present invention relates to a machine for applying threaded members such as caps or tops to mated parts and automatically tightening them to a predetermined torque value with improved exactness and reproducibility on a mass production basis. It relates more particularly to the tightening of collar caps or retainers in fuze bodies which retain the fuze's arming escapement and its sealing means within the body in such a manner that the escapement is snugly retained within the body without distortion of any of its parts.

Fuze arming escapements are used primarily in military projectiles and the like in order to provide a time period lapse between the launching of the projectile and the time when it becomes armed. Ordinarily, a clock-like mechanism type of escapement is used having a small gear train on bearings which must be kept as nearly free of friction as possible in order to assure free running and accurate timing as the escapement operates. It can be seen that even a slight distortion of these parts by over tightening of the retainer will produce a slowing or even stopping of the escapement mechanism which, with its resultant failure to perform, cannot be tolerated. Furthermore, any looseness of the escapement mechanism in the body is also intolerable since the chances of its failure would be greatly increased under the shock and vibration effects which would be produced. The present invention provides a machine which very effectively tightens but does not overtighten the retainer so that neither looseness nor distortion are present and does this on a rapid mass production basis utilizing the principle of a weight lifted by a cable pulled by the force of a rigid torque arm, thus eliminating the problems of resiliency and fatigue common to torque wrenches or spring systems and which may produce errors after repeated use.

It is, therefore, an object of the present invention to provide a machine for tightening threaded members into mated parts to an automatically precise amount of torque.

It is also an object to provide a machine which is capable of performing such an operation on a rapid mass production basis with repeated precision.

It is also an object to provide a machine of the aforedescribed type which will precisely tighten a retainer into a fuze body to a predetermined torque in order to retain therein an escapement mechanism in a firm but distortionfree manner.

It is also an object of the present invention to provide a machine for tightening parts to a predetermined torque which eliminates many of the problems associated with the use of springs or bending beams, such as the resiliency of such systems (the need for dampers is eliminated) or fatigue of the springs or bending beams which change their calibration.

Other objects and advantages of the present invention will be seen from the following description and drawings.

Figure 4:
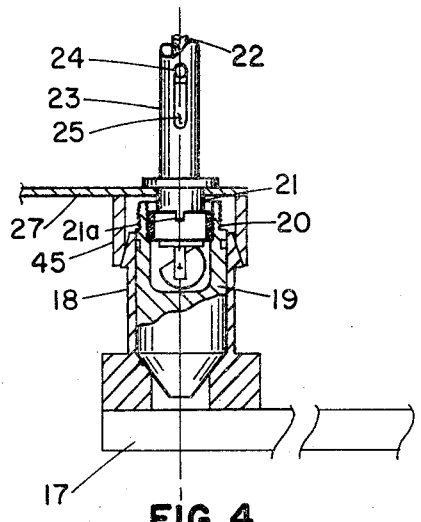
FIG. 4 is a sectional view of a fuze with the escapement mechanism and its retainer in place in the work holder and with the guide means in place upon it.

A preferred embodiment of the present invention is disclosed in the description which follows and in the drawings which accompany it.

Figure 1:
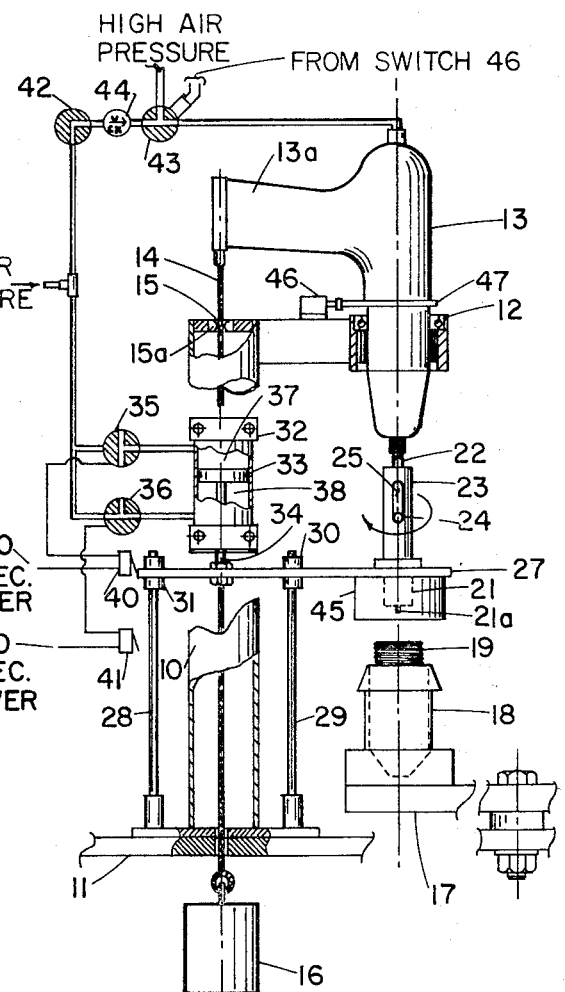
FIG. 1 is a partially cutaway side view of the machine showing the torque arm, cable, weight and the electrical, air pressure and valve systems.

With reference to FIG. 1, a frame 10 is firmly attached to a fixed base 11 with the upper portion of frame 10 including an extended portion at its upper end which terminates in a bearing 12. An air powered motor 13 is set into bearing 12 with its longitudinal axis substantially vertical in the manner shown and it will be seen that the motor will now be free to move in a rotary direction about its longitudinal axis. An air motor of the type utilized in this machine is adapted to be hand held and has a handle, arm or pistol grip 13a which extends outwardly from the motor in the manner shown. At or near the outer terminus of arm 13a is attached a flexible cable 14 which passes through a loosely fitting opening or fairlead hole 15 provided in the top of frame 10. A plastic insert 15a of polytetrafluoroethylene (such as Teflon) or a polyamide (such as nylon 66) provides a cable guide which is both long wearing and of low coefficient of friction. Cable 14 then extends downward through the hollow interior of frame 10, passes through a relatively large hole in its base 11 and terminates in an attachment to a free hanging weight 16.

Figure 3:
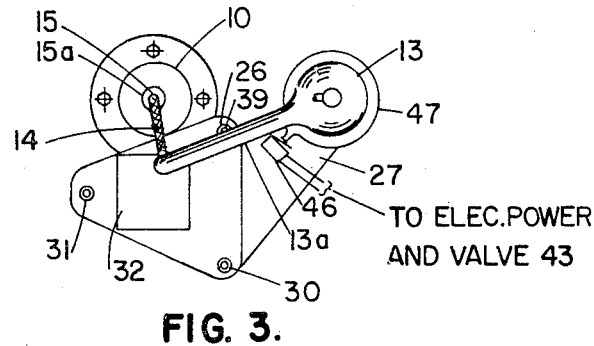
FIG. 3 is a top view of the machine.
Figure 2:
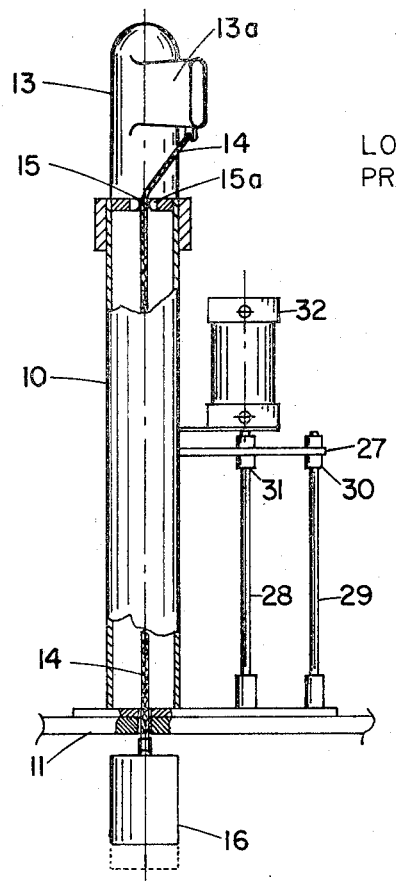
FIG. 2 is an end view of the machine showing the lift mechanism and the cable and arm arrangement.

From the foregoing, it will be seen that if motor 13 is moved in a rotary manner about its longitudinal axis in the direction of the arrow in FIG. 3, arm 13a will exert a pull on cable 14 as it bears on fairlead 15a and will lift the weight 16 as can be seen in FIG. 2.

With reference again to FIG. 1, attached to base 11 is a rotary turntable 17 having a number of workpiece fixtures or holders 18 mounted upon it adjacent to its periphery and adapted to be moved into position directly under the air motor 13. The workpiece, or fuze housing 19 in this instance, is held firmly in this fixture 18 having been placed in it in a prior operation and it automatically becomes in position with its longitudinal axis in alignment with the longitudinal axis of the air motor as shown as the table 17 is rotated and then stopped at the appropriate position by automatic or operator controlled means (not shown). Upon arrival of the workpiece under the air motor 13, the nut or retainer 20 which is to be tightened has already been placed in position in the fuze housing 19 with its thread started, i.e. in engagement but not screwed down.

At the lower end of motor 13 is a screwdriver or spanner wrench 21 which is attached to air motor drive shaft 22 by means of a slip coupling 23 which in turn comprises a pin 24 through shaft 22 and which extends out from shaft 22 and intercepts a vertical slot 52 in the tubular upper end of wrench 21 in the manner shown particularly in enlarged view FIG. 4. In this manner, wrench 21 is positively driven but can be slid up and down with respect to the air motor 13 and the workpiece beneath it so that engagement or disengagement with the retainer 20 can be accomplished by raising or lowering the wrench 21 without moving the motor 13 also.

In order to effect this raising and lowering of the wrench 21, a horizontal plate 27 is provided capable of being slid upward and downward on vertical rods 26, 28 and 29. These are attached in a fixed manner to base 11, extend upward as shown in FIGS. 1 and 2 and pass through and are slidable in linear ball bushings 30, 31 and 39 in plate 27. Attached to frame 10 in a fixed manner is air cylinder 32 having a piston 33 slidable within it and a piston rod 34 extending out of it and attached to plate 27 all in the manner shown. A source of air under low pressure (25 pounds per square inch for example) is supplied to chamber 37 and 38 within the air cylinder 32 by suitable piping and enters through control valves 35 and 36 in the manner shown in FIG. 1 and as will be described later. Electrical limit switches 40 and 41 are provided to prevent over travel of the plate 27 and their operation will also be explained later. Air under low pressure is also supplied to the air motor 13 from a supply source and its flow is controlled by valves 42 and 43 with a check valve 44 therebetween. In addition, a source of air under relatively high pressure (65 pounds per square inch for example) is supplied to the air motor and is controlled by valve 43.

A positioning guide 45 is attached to the lower side of plate 27 as will be seen from FIGS. 1 and 3 and serves to guide the wrench 21 into the exact center of the workpiece by fitting itself down over the outside of the holder 18 which is tapered to fit inside the guide 45 as shown.

A limit switch 46 is provided adjacent to air motor 13 and is actuated by cam 47 which is fixedly attached to motor 13 and moves with it in rotary fashion.

OPERATION

In operation, valve 35 is turned to the position shown in FIG. 1 in order to vent chamber 37 of air cylinder 32 while valve 36 is turned to the position shown to admit air under pressure into chamber 38 thereby moving piston 33, its piston rod 34 and table 27 upward to clear the way for the next workpiece to be brought into position. Limit switches 40 and 41 operate at the desired upper and lower travel positions of plate 27 and electrically operate air valves 35 and 36 to stop the movement of piston 33 and rod 34. Turntable 17 is now rotated to bring work holder 18 and fuze housing 19 into position directly under air motor 13 after which table 27 is lowered by the turning of valve 36 to the vent position and valve 35 to the through flow position, which action applied air pressure to chamber 37 of cylinder 32, relieves the pressure in chamber 38 and moves the piston 33, rod 34 and plate 27 downward until guide 45 fits firmly over holder 18 with their tapered surfaces in contact as shown in FIG. 2. As this occurs the blade 21a of slowly rotating wrench 21 comes into engagement with the slot in retainer 20 and starts to turn the retainer 20. The valve 43 is then turned to allow high pressure air to enter motor 13 (check valve 44 preventing flow to other parts of the system) and thereby causes it to rotate its shaft 22 much more rapidly. Wrench 21 accordingly rotates more rapidly and retainer 20 is quickly tightened in place with increasing torque effect upon wrench 21 and a corresponding reaction torque effect on air motor 13. As this occurs, arm 13a of the motor 13 moves to the right in FIG. 2 and in a clockwise circular arc in FIG. 3. As the retainer 20 becomes properly tightened the reaction torque effect on motor 13 becomes so great that arm 13a moves sufficiently to and with such force that cable 14 is puled and weight 16 is lifted slightly. At this time, the lobe of cam 13 depresses limit switch 46 causing it to electrically turn valve 43 to the "vent" position which relieves the air pressure supply to motor 13 and causes it to stop its rotation.

Air cylinder 32 is then actuated in the manner previously described to lift table 27, and the work holder 18 and fuze housing 19 with the installed retainer 20 are rotated out of the way and the next holder and fuze housing take their place ready for the same operation to be repeated as just described.

The entire operation is accomplished in a matter of seconds and, with proper adjustments of the limit switches and careful original calibration of the weighted cable system, accurate reproduction of the finished product is assured without the need for recalibration or further adjustment throughout a production run, since there are no springs or bending beam to affect the calibration because of resiliency of fatigue and any stretching of the cable is of no effect.

It is to be understood that the form of my invention herewith shown and described is to be taken as a preferred example of the same and that various changes in the shape, size and arrangement of parts may be resorted to without departure from the spirit of the invention or the scope of the subjoined claims.

What is claimed is:

1. A machine for tightening a threaded member with respect to a mated part and to a predetermined amount of torque comprising a torque-producing means, bearing means mounting the torque-producing means so that it can move in a rotary manner about its longitudinal axis, means for bringing the torque-producing means into position engagement with the threaded member, a holder for holding the mated part stationary with respect to the threaded member, means for starting the torque-producing means in operation, a laterally extended arm attached to said torque-producing means, a flexible cable attached to the outer end of the arm, a weight attached to the cable, a fixed fairlead between the arm and the weight, and means for stopping operation of the torque producing means upon movement of the arm to a predetermined position as the predetermined amount of torque is reached.

2. The invention set forth in claim 1 with the torque-producing means comprising a motor and said last-named means comprising a cam rotatable with the motor as torque is produced, a switch actuated by the cam, and valve means actuated thereby to effect shut down of the motor.

3. The invention set forth in claim 2 with the means for bringing the torque-producing means into positive engagement with the threaded member comprising a slip coupling attached to the torque-producing means and passing through a table and adapted to be moved up and down with said table, means for lowering and raising the table within limits, a guide attached to the lower side of the table and adapted to seal upon the holder, a wrench attached to the lower end of said slip coupling, and means for slowly rotating said wrench, whereby upon lowering of the table until the guide seats upon the holder the wrench engages the threaded member and when the table is raised the wrench becomes disengaged.

4. The invention set forth in claim 3 with the means for lowering and raising the table within limits comprising an air cylinder, a supply of air under pressure, valve means for supplying compressed air to the air cylinder or venting it thererfom, and electrical switches actuated by movement of the table and connected to the valve means to actuate the valve means upon movement of the table to predetermined limits.

5. The invention set forth in claim 1 with the torque-producing means comprising an air motor having a shaft, and at least one valve adapted to admit selectively low pressure air or high pressure air to said motor, whereby low speed or high speed rotation of said shaft is caused.

6. The invention set forth in claim 3 with the motor being an air motor and additional means for rapidly rotating the wrench after it engages the threaded member comprising a source of high pressure air and valve means operable to admit the high pressure air to the air motor.

References Cited

UNITED STATES PATENTS

| 3,088,349 | 5/1963 | Cowan et al. | 81—52.4 |
| 2,880,770 | 4/1959 | Ettinger | 81—52.4 X |

JAMES L. JONES, Jr., Primary Examiner

U.S. Cl. X.R.

173—12